(12) United States Patent
Johnson

(10) Patent No.: US 9,830,568 B2
(45) Date of Patent: Nov. 28, 2017

(54) CONTROLLING AND MANAGING IDENTITY ACCESS RISK

(71) Applicant: Bank of America Corporation, Charlotte, NC (US)

(72) Inventor: Dwayne Robert Johnson, Issaquah, WA (US)

(73) Assignee: Bank of America Corporation, Charlotte, NC (US)

( * ) Notice: Subject to any disclaimer, the term of this patent is extended or adjusted under 35 U.S.C. 154(b) by 680 days.

(21) Appl. No.: 14/522,804

(22) Filed: Oct. 24, 2014

(65) Prior Publication Data

US 2016/0048782 A1    Feb. 18, 2016

Related U.S. Application Data

(60) Provisional application No. 62/037,306, filed on Aug. 14, 2014.

(51) Int. Cl.
     *G06Q 10/06*      (2012.01)
     *H04L 29/06*      (2006.01)

(52) U.S. Cl.
     CPC ......... *G06Q 10/0635* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 8,782,784 B1 * | 7/2014 | Bruskin | H04L 63/1425 713/2 |
| 9,426,169 B2 * | 8/2016 | Zandani | H04L 63/1433 |
| 9,537,892 B2 * | 1/2017 | Moloian | H04L 63/10 |
| 2008/0262886 A1 | 10/2008 | Veeningen et al. | |
| 2008/0288330 A1 * | 11/2008 | Hildebrand | G06Q 10/06 705/7.28 |
| 2009/0119139 A2 | 5/2009 | Veeningen et al. | |
| 2009/0265199 A1 | 10/2009 | Moerdler et al. | |
| 2009/0265200 A1 | 10/2009 | Boswell et al. | |

(Continued)

FOREIGN PATENT DOCUMENTS

WO    WO 2008/141327 A1 *    11/2008  ......... G06F 15/173

*Primary Examiner* — Christopher Revak
(74) *Attorney, Agent, or Firm* — Banner & Witcoff, Ltd.; Michael A. Springs

(57) ABSTRACT

Methods and systems for controlling and managing identity and access management risks are presented. A computing device may generate a maturity model that maps a plurality of access management controls to a plurality of information technology (IT) resources associated with an IT environment. Subsequently, the computing device may determine, for each IT resource of the plurality of IT resources, a plurality of access management maturity scores. Each access management maturity score of the plurality of access management scores may correspond to an access management control of the plurality of access management controls that are associated with the corresponding IT resource. The computing device then may determine an aggregate maturity score for the IT environment based on the plurality of access management maturity scores for the plurality of IT resources. Thereafter, the computing device may provide the maturity model and the aggregate maturity score to at least one governance system.

20 Claims, 10 Drawing Sheets

(56) References Cited

U.S. PATENT DOCUMENTS

| | | |
|---|---|---|
| 2009/0265209 A1 | 10/2009 | Swaminathan et al. |
| 2009/0319312 A1 | 12/2009 | Moerdler et al. |
| 2010/0233663 A1 | 9/2010 | Pennington et al. |
| 2010/0250497 A1 | 9/2010 | Redlich et al. |
| 2010/0251207 A1 | 9/2010 | Allam et al. |
| 2010/0275263 A1 | 10/2010 | Bennett et al. |
| 2010/0324952 A1 | 12/2010 | Bastos et al. |
| 2011/0040587 A1 | 2/2011 | Gerke et al. |
| 2011/0066466 A1 | 3/2011 | Narayanan |
| 2011/0066570 A1 | 3/2011 | Kolo et al. |
| 2011/0066571 A1 | 3/2011 | Goodman |
| 2011/0087704 A1 | 4/2011 | Bishop et al. |
| 2011/0112876 A1 | 5/2011 | Khare et al. |
| 2011/0137622 A1 | 6/2011 | Bhandari et al. |
| 2011/0145028 A1 | 6/2011 | Khilnani |
| 2011/0145657 A1 | 6/2011 | Bishop et al. |
| 2011/0196719 A1 | 8/2011 | Bhandari et al. |
| 2011/0252479 A1 | 10/2011 | Beresnevichiene et al. |
| 2012/0054095 A1 | 3/2012 | Lesandro et al. |
| 2012/0069131 A1 | 3/2012 | Abelow |
| 2012/0101872 A1 | 4/2012 | Iyengar et al. |
| 2012/0144363 A1 | 6/2012 | Bernardini et al. |
| 2012/0158678 A1 | 6/2012 | McGraw et al. |
| 2012/0179511 A1 | 7/2012 | Lee et al. |
| 2012/0203597 A1 | 8/2012 | Jagdev et al. |
| 2012/0221377 A1 | 8/2012 | Carrato et al. |
| 2012/0245896 A1 | 9/2012 | Bernardini et al. |
| 2012/0266209 A1 | 10/2012 | Gooding et al. |
| 2012/0278135 A1 | 11/2012 | Haber |
| 2012/0323624 A1 | 12/2012 | Bernardini et al. |
| 2012/0323815 A1* | 12/2012 | Channabasavaiah .. G06Q 10/06 705/348 |
| 2013/0014079 A1 | 1/2013 | Chaar et al. |
| 2013/0014081 A1 | 1/2013 | Chaar et al. |
| 2013/0030850 A1* | 1/2013 | Marrelli ................ G06Q 10/00 705/7.11 |
| 2013/0035973 A1 | 2/2013 | Desai et al. |
| 2013/0080992 A1 | 3/2013 | Chaar et al. |
| 2013/0090989 A1 | 4/2013 | Deb et al. |
| 2013/0110733 A1 | 5/2013 | Mohanty et al. |
| 2013/0132161 A1 | 5/2013 | Mohanty et al. |
| 2013/0132162 A1 | 5/2013 | Banerjee et al. |
| 2013/0173352 A1 | 7/2013 | Pande et al. |
| 2013/0173353 A1 | 7/2013 | Kamath et al. |
| 2013/0173494 A1 | 7/2013 | Tayeb et al. |
| 2013/0185693 A1 | 7/2013 | Chaar et al. |
| 2013/0227712 A1* | 8/2013 | Salem ................ G06F 21/6218 726/30 |
| 2013/0253979 A1 | 9/2013 | Williams et al. |
| 2013/0253992 A1 | 9/2013 | Pyrlina |
| 2013/0254738 A1 | 9/2013 | Chaar et al. |
| 2014/0075004 A1 | 3/2014 | Van Dusen et al. |
| 2014/0096105 A1 | 4/2014 | Bernardini et al. |
| 2014/0149283 A1 | 5/2014 | Roselli et al. |
| 2014/0164065 A1 | 6/2014 | Prieto |
| 2014/0218389 A1 | 8/2014 | Bennett et al. |
| 2014/0229242 A1 | 8/2014 | Dawkes et al. |
| 2014/0236679 A1 | 8/2014 | Narayanan |

\* cited by examiner

IAM Maturity Model

| COBIT 5 based on ISO 15504 -> | | 1<br>Performed Ad Hoc<br>Heroic Efforts<br>Process achieves its purpose (desired outcome may not be achieved) | 2<br>Managed<br>Planned and Managed<br>Implemented in a managed fashion (planned, monitored, and adjusted) and its work products are appropriately established, controlled, and maintained |
|---|---|---|---|
| Process Map | Category | | |
| Governance | Management | 1 - Ad hoc | 2 - Defined routines |
| | Standards | 1 - Primarily SME expertise leveraged | 2 - LOB standards and directives |
| | Control Owner | 1 - Not defined | 2 - Accountability enforced reactively |
| | QA & QC | 1- Ad hoc defined | 2 - QA (not against IAM standards) |
| | Stakeholders | 1 - Diversified teams | 2 - Defined and respond to events |
| | Organization | 1 - Not defined | 2 - Coordinated teams |
| | Risk Portfolio | 1 - Not defined | 2 - Understood w/ confines of process |
| Build & Develop | Architecture | 1 - Ad hoc | 2 - Incomplete and/or fragmented |
| | Development | 1 - Patchwork | 2 - Project with assigned PMO |
| Tools | Solutions | 1 - Self taught | 2 - Redundant |
| | Training | 1 - Break / fix | 2 - LOB training |
| Operations | Process | 1 - Not defined | 2 - Coordinated |
| | Reconciliation | 1 - Ad hoc | 2 - Reconciliation as deemed needed |
| | Enforcement | 1 - Not defined | 2 - LOB enforced |
| Reporting & Monitoring | Dashboards | 1 - Not defined | 2 - Defined and locally used |
| | Metrics | 1 - Not defined | 2 - Random |
| | Report | 1 - Not defined | 2 - Random |

FIG. 4A

IAM Maturity Model

| | | 3<br>Established<br>Process Standardized | 4<br>Predictable/Measurable<br>Run and Operate within Thresholds |
|---|---|---|---|
| COBIT 5 based on ISO 15504 -> | | Implemented using a defined process that is capable of achieving its outcomes | Operates within defined limits to achieve its process outcomes |
| Process Map | Category | | |
| Governance | Management | 3 - IAM standards, processes, and routines | 4 - Add risk limits and thresholds |
| | Standards | 3 - IAM standards | 4 - Add scheduled and align with SDLC |
| | Control Owner | 3 - Identified, engaged, and enforced | 4 - Add risk limits and thresholds |
| | QA & QC | 3 - QA & QC defined to IAM standards | 4 - Add risk limits and thresholds |
| | Stakeholders | 3 - Engaged in IAM management routines | 4 - Add proxy and engaged in planning |
| | Organization | 3 - Unified or replicated teams | 4 - Unified teams and common services |
| | Risk Portfolio | 3 - Residual risk understood & vetted | 4 - Add risk metrics, limits, and thresholds |
| Build & Develop | Architecture | 3 - Target state architecture defined | 4 - Add measurements of outcomes |
| | Development | 3 - Project aligned to IAM solutions | 4 - Add creates risk metrics |
| Tools | Solutions | 3 - Consolidated | 4 - Add automated QA |
| | Training | 3 - IAM training and user network | 4 - Add effectiveness metrics |
| Operations | Process | 3 - Unified or replicated | 4 - Add risk limits and thresholds |
| | Reconciliation | 3 - Reconciliation continuous and scripted | 4 - Add risk limits and thresholds |
| | Enforcement | 3 - Consequence model and adherence | 4 - Add trends and metrics |
| Reporting & Monitoring | Dashboards | 3 - Defined and feeds Governance | 4 - Add risk limits and thresholds |
| | Metrics | 3 - Defined operations, behavior, and control | 4 - Add risk limits and thresholds |
| | Report | 3 - Monitoring IAM standards adherence | 4 - Add risk limits, thresholds, and outliers |

FIG. 4B

IAM Maturity Model

| | | 5<br>Optimized<br>Highly Automated and Adaptable |
|---|---|---|
| COBIT 5 based on ISO 15504 -> | | Automate & continuously improved to meet relevant current and projected goals |
| *Process Map* | *Category* | |
| Governance | Management | 5 - Add integration with GIS routines |
| | Standards | 5 - Add alignment to resource lifecycle |
| | Control Owner | 5 - Add automated reporting |
| | QA & QC | 5 - Add automation in support of QC |
| | Stakeholders | 5 - Add integration into LOB planning |
| | Organization | 5 - Unified teams and automated services |
| | Risk Portfolio | 5 - Risk metrics trigger process |
| Build & Develop | Architecture | 5 - Add significant automation |
| | Development | 5 - Add align to MGP |
| Tools | Solutions | 5 - Add end-to-end integration |
| | Training | 5 - Add annual refresh with e-learning |
| Operations | Process | 5 - End-to-end process automated |
| | Reconciliation | 5 - Add automated notification and escalation |
| | Enforcement | 5 - Add continuous proactive analytics |
| Reporting & Monitoring | Dashboards | 5 - Alerts automated |
| | Metrics | 5 - Add feed/linkage to adherence model |
| | Report | 5 - Add automate for continuous improvement |

FIG. 4C

| Maturity Roadmap | |
|---|---|
| Year | Score |
| 2012 | XXX |
| 2013 | AAA |
| 2014 | BBB |
| 2015 | CCC |
| 2016 | DDD |
| 2017 | YYY |

CONTROLLING AND MANAGING IDENTITY ACCESS RISK

CROSS-REFERENCE TO RELATED APPLICATIONS

This application claims the benefit of U.S. Provisional Patent Application Ser. No. 62/037,306, filed Aug. 14, 2014, and entitled "CONTROLLING AND MANAGING IDENTITY ACCESS RISK," and which is incorporated by reference herein in its entirety.

BACKGROUND

Aspects of the disclosure relate to computer hardware and software. In particular, one or more aspects of the disclosure generally relate to computer hardware and software for controlling and managing identity and access management risks.

Large organizations, such as financial institutions, may have large information technology (IT) environments that include many different resources and many different kinds of resources. When making investments and taking other steps to ensure and improve the security, reliability, and operations of various information technology resources throughout an information technology environment, it may be difficult to identify which resources and/or which areas of the information technology environment require more attention and/or investment than other resources and/or areas. For example, it may be difficult to distinguish resources and/or areas that have relatively highly controlled risks from resources and/or areas that may face broader risks, despite existing measures and previously-made investments to reduce and/or control such risks.

SUMMARY

Aspects of the disclosure relate to various systems and techniques that provide effective, efficient, scalable, and convenient ways of controlling and managing identity and access management risks, particularly in ways that may enable an organization to identify specific resources and/or areas within an information technology environment where investments should be made and/or should not be made, as well in ways that may enable the organization to identify what types of risks are being controlled and/or should be controlled. Additional aspects of the disclosure may provide for the automated application of specific controls to specific resources, for instance, by one or more governance systems.

In some arrangements discussed in greater detail below, a computer-implemented process and/or one or more associated computer systems may utilize a maturity model that enables an organization, such as a financial institution, to identify and understand the relative maturity of various risk controls that may be applied to various resources associated with the organization's information technology environment. In particular, various indicators may be defined that are applicable across many different types of information technology resources, and these indicators may be used to quickly and easily assess the state and maturity of identity and access management controls that may be applied to and/or otherwise associated with particular information technology resources within the organization's information technology environment. By evaluating the organization's information technology resources and their corresponding identity and access management controls using such indicators, one or more maturity scores may be determined and populated into a maturity model, and such maturity scores may reflect the degree to which particular identity and access management risks have been controlled. In addition, an aggregate maturity score may be determined to assess a level of overall identity and access management risk across the information technology environment, one or more targets may be set, and/or a maturity roadmap may be defined to ensure that an organization's control of various identity and access management risks improves over time.

In accordance with one or more embodiments, a computing device may generate a maturity model that maps a plurality of access management controls to a plurality of IT resources associated with an IT environment. Subsequently, the computing device may determine, for each IT resource of the plurality of IT resources, a plurality of access management maturity scores. Each access management maturity score of the plurality of access management scores may correspond to an access management control of the plurality of access management controls that are associated with the corresponding IT resource. The computing device then may determine an aggregate maturity score for the IT environment based on the plurality of access management maturity scores for the plurality of IT resources. Thereafter, the computing device may provide the maturity model and the aggregate maturity score for the IT environment to at least one governance system.

In some embodiments, determining the plurality of access management maturity scores for each IT resource of the plurality of IT resources may include receiving a plurality of indicator values. Each indicator value of the plurality of indicator values may be associated with a category of a plurality of categories, and each category of the plurality of categories may be associated with a process map area of a plurality of process map areas.

In some embodiments, the computing device may generate, for each IT resource of the plurality of IT resources, a plurality of access management maturity score targets. Each access management maturity score target of the plurality of access management maturity score targets may be generated for a particular access management control of the plurality of access management controls that are associated with the corresponding IT resource. In some instances, the computing device may generate an aggregate maturity score target for the IT environment based on the plurality of access management maturity score targets for the plurality of IT resources. In addition, the computing device may generate a maturity roadmap based on the aggregate maturity score target for the IT environment.

In some embodiments, the computing device may periodically reevaluate, for each IT resource of the plurality of IT resources, the plurality of access management maturity scores to determine an updated aggregate maturity score for the IT environment. For example, such an updated aggregate maturity score may be determined twice a year (or on another regular basis) to track progress and/or identity issues associated with risk management and/or governance processes.

In some embodiments, the plurality of access management controls may include a provision control, a de-provision control, an authentication control, an authorization control, and an access review control. Additionally or alternatively, the plurality of IT resources associated with the IT environment may include at least one application resource, at least one database resource, at least one platform resource, at least one network infrastructure resource, at least one collaboration site resource, and at least one third-party hosting resource.

In some embodiments, the plurality of process map areas may include a governance area, a build-and-develop area, a tools area, an operations area, and a reporting-and-monitoring area. In some instances, the governance area may be associated with a first subset of the plurality of categories, and the first subset of the plurality of categories may include a management category, a standards category, a control-owner category, a quality-assurance-and-quality-control category, a stakeholders category, an organization category, and a risk-portfolio category. Additionally or alternatively, the build-and-develop area may be associated with a second subset of the plurality of categories, and the second subset of the plurality of categories may include an architecture category and a development category. Additionally or alternatively, the tools area may be associated with a third subset of the plurality of categories, and the third subset of the plurality of categories may include a solutions category and a training category. Additionally or alternatively, the operations area may be associated with a fourth subset of the plurality of categories, and the fourth subset of the plurality of categories may include a process category, a reconciliation category, and an enforcement category. Additionally or alternatively, the reporting-and-monitoring area may be associated with a fifth subset of the plurality of categories, and the fifth subset of the plurality of categories may include a dashboards category, a metrics category, and a report category.

In some embodiments, each indicator value of the plurality of indicator values may be selected from a group of possible indicator values including a performed-ad-hoc value, a managed value, an established value, a predictable-measurable value, and an optimized value. In additional or alternative embodiments, the at least one governance system may be configured to identify one or more immature areas in the IT environment for investment based on the maturity model. In some instances, the at least one governance system may be configured to determine, for at least one specific IT resource of the plurality of IT resources, at least one specific access management control of the plurality of access management controls for investment. In addition, in some instances, the at least one governance system may be configured to generate one or more key deliverables for the at least one specific access management control.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4A-4C illustrate an example of various indicator values that may be used in determining one or more maturity scores according to one or more aspects of the disclosure;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

As noted above, certain embodiments are discussed herein that relate to controlling and managing identity and access management risks. Before discussing these concepts in greater detail, however, an example of a computing device that can be used in implementing various aspects of the disclosure, as well as an example of an operating environment in which various embodiments can be implemented, will first be described with respect to FIGS. 1A and 1B.

Figure 1A:
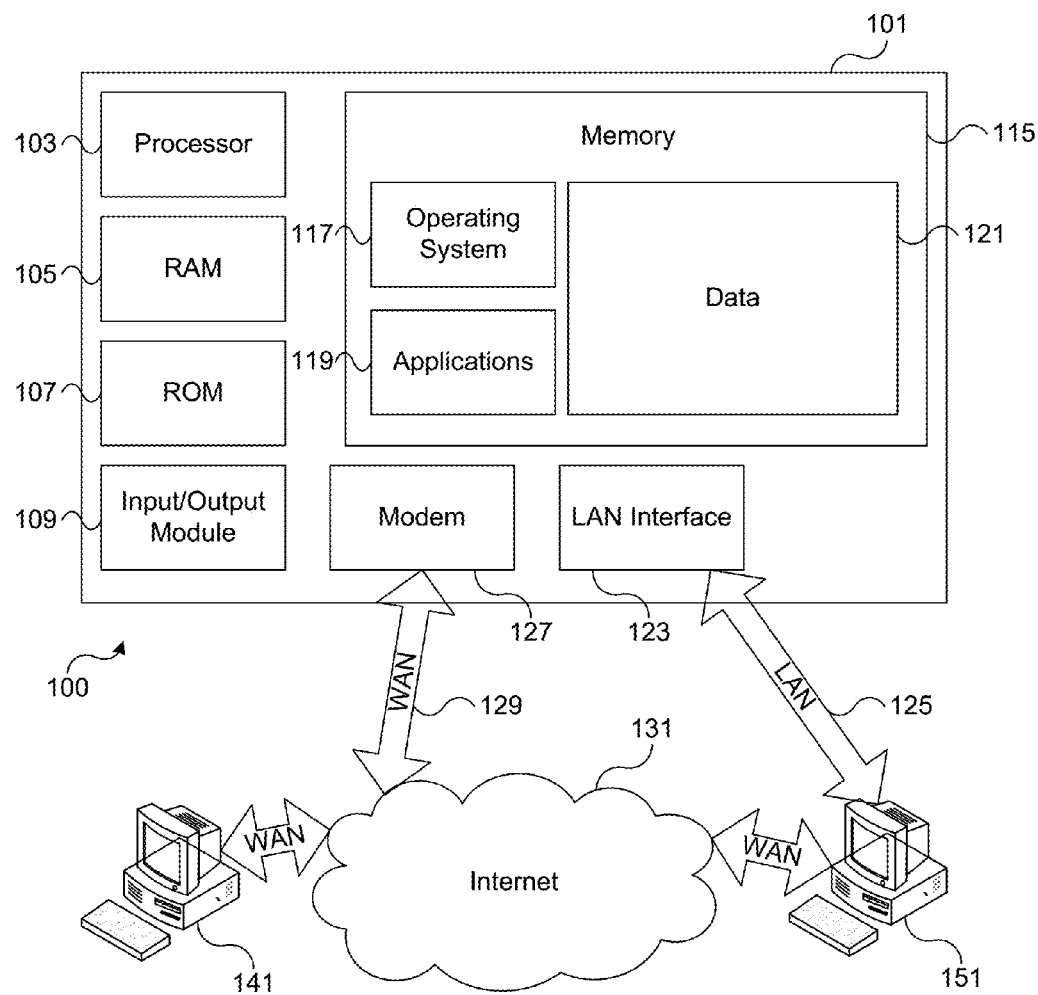
FIG. 1A illustrates an example operating environment in which various aspects of the disclosure may be implemented.

FIG. 1A illustrates an example block diagram of a generic computing device 101 (e.g., a computer server) in an example computing environment 100 that may be used according to one or more illustrative embodiments of the disclosure. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a microphone, mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 141 and 151. The terminals 141 and 151 may be personal computers or servers that include many or all of the elements described above with respect to the generic computing device 101. The network connections depicted in FIG. 1A include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Generic computing device 101 and/or terminals 141 or 151 may also be mobile terminals (e.g., mobile phones, smartphones, PDAs, notebooks, and so on) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1B:
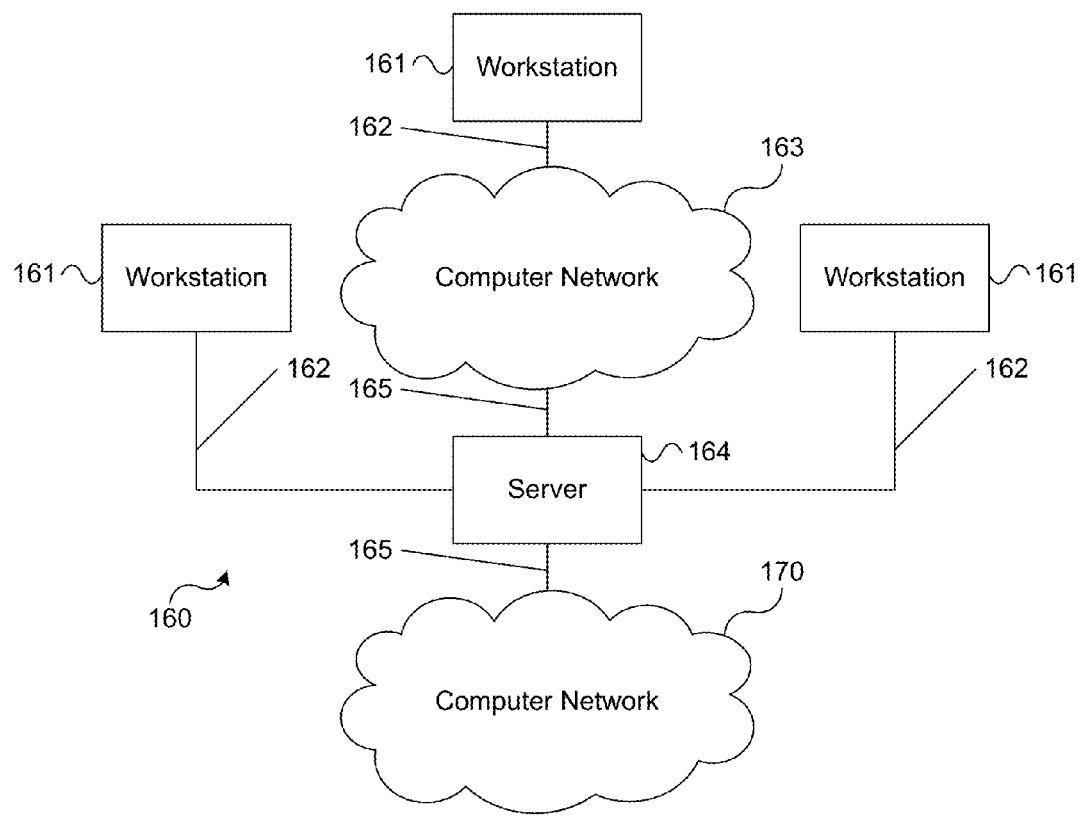
FIG. 1B illustrates another example operating environment in which various aspects of the disclosure may be implemented.

FIG. 1B illustrates another example operating environment in which various aspects of the disclosure may be implemented. As illustrated, system 160 may include one or more workstations 161. Workstations 161 may, in some examples, be connected by one or more communications links 162 to computer network 163 that may be linked via communications links 165 to server 164. In system 160, server 164 may be any suitable server, processor, computer, or data processing device, or combination of the same. Server 164 may be used to process the instructions received from, and the transactions entered into by, one or more participants.

According to one or more aspects, system 160 may be associated with a financial institution, such as a bank. Various elements may be located within the financial institution and/or may be located remotely from the financial institution. For instance, one or more workstations 161 may be located within a branch office of a financial institution. Such workstations may be used, for example, by customer service representatives, other employees, and/or customers of the financial institution in conducting financial transactions via network 163. Additionally or alternatively, one or more workstations 161 may be located at a user location (e.g., a customer's home or office). Such workstations also may be used, for example, by customers of the financial institution in conducting financial transactions via computer network 163 or computer network 170.

Computer network 163 and computer network 170 may be any suitable computer networks including the Internet, an intranet, a wide-area network (WAN), a local-area network (LAN), a wireless network, a digital subscriber line (DSL) network, a frame relay network, an asynchronous transfer mode network, a virtual private network (VPN), or any combination of any of the same. Communications links 162 and 165 may be any communications links suitable for communicating between workstations 161 and server 164, such as network links, dial-up links, wireless links, hard-wired links, and/or the like.

Having described an example of a computing device that can be used in implementing various aspects of the disclosure and an operating environment in which various aspects of the disclosure can be implemented, several embodiments will now be discussed in greater detail. As introduced above, some aspects of the disclosure generally relate to controlling and managing identity and access management risks, particularly in ways that may enable an organization to identify specific resources and/or areas within an information technology environment where investments should be made and/or should not be made, as well in ways that may enable the organization to identify what times of risks are being controlled and/or should be controlled. In the discussion below, various examples illustrating how identity and access management risks may be controlled and managed in accordance with one or more embodiments will be provided.

Figure 2:
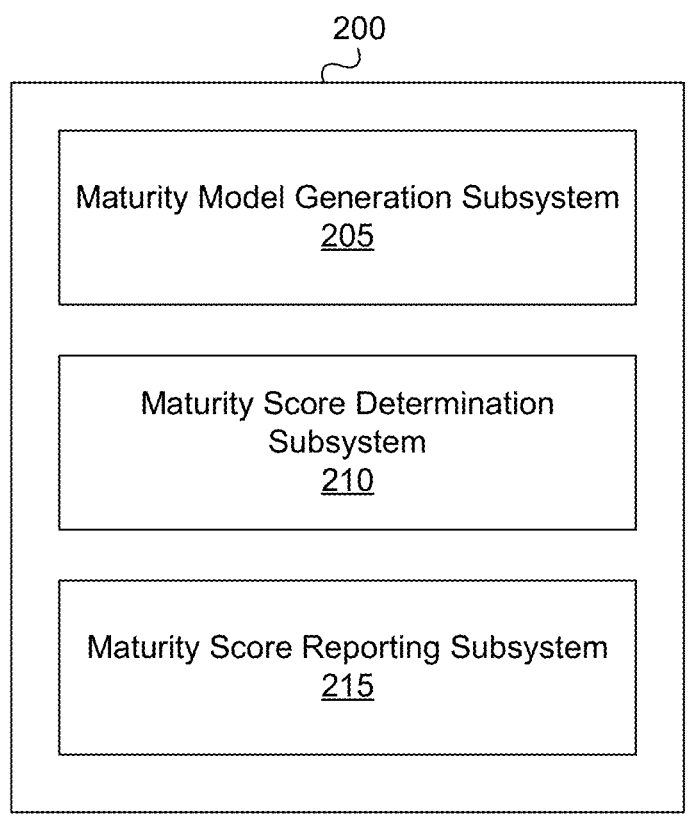
FIG. 2 illustrates an example of a system for controlling and managing identity and access management risks according to one or more aspects of the disclosure.

FIG. 2 illustrates an example of a system 200 for controlling and managing identity and access management risks according to one or more embodiments. In some embodiments, system 200 may be implemented in one or more computing devices, which may include and/or incorporate one or more processors, one or more memories, and/or one or more aspects of the computing device 101 discussed above. In some instances, system 200 may include a number of different subsystems and/or databases. In some arrangements, all of the subsystems included in system 200 may be included in and/or incorporated into a single computing device, while in other arrangements, each subsystem included in system 200 (and/or combinations thereof) may be included in and/or incorporated into a distinct and/or dedicated computing device. In addition, each of the databases included in system 200 may be included in and/or incorporated into the same computing device as one or more other subsystems of system 200, or, in other arrangements, may be included in and/or incorporated into distinct and/or dedicated computing devices (which, e.g., are communicatively coupled to and/or otherwise accessible to system 200 and/or its various subsystems).

As seen in FIG. 2, in some embodiments, system 200 may include a maturity model generation subsystem 205, a maturity score determination subsystem 210, and a maturity score reporting subsystem 215. This arrangement represents one example configuration of system 200. In other embodiments, one or more elements of system 200 may be combined and/or additional and/or alternative subsystems may be included in addition to and/or instead of those shown in FIG. 2.

In some embodiments, maturity model generation subsystem 205 may be configured to generate one or more maturity models. For example, maturity model generation subsystem 205 may generate a maturity model that maps a plurality of access management controls to a plurality of information technology resources associated with an information technology environment.

In some embodiments, maturity score determination subsystem 210 may be configured to determine one or more maturity scores. For example, maturity score determination subsystem 210 may determine, for each information technology resource of a plurality of information technology resources associated with an information technology environment, a plurality of access management maturity scores. Each access management maturity score of the plurality of access management scores may correspond to an access management control of the plurality of access management controls that are associated with the corresponding information technology resource. Additionally or alternatively, maturity score determination subsystem 210 may determine an aggregate maturity score for the information technology environment based on the plurality of access management maturity scores for the plurality of information technology resources.

In some embodiments, maturity score reporting subsystem 215 may be configured to report one or more maturity scores to one or more other systems and/or entities. For example, maturity score reporting subsystem 215 may provide the maturity model and the aggregate maturity score for the information technology environment to at least one governance system. Such a governance system may, for example, be a computer system separate from system 200 (and may, e.g., be communicatively coupled to system 200 via one or more network connections and/or the like) or alternatively may be a subsystem included in system 200.

As indicated above, these are examples of the subsystems, databases, and/or other elements that may be included in system 200 in some embodiments, as well as some of the functions that may be performed (e.g., by system 200 and its various subsystems). In other embodiments, additional and/or alternative subsystems, databases, and/or other elements may similarly be included, and/or other functions may be performed, in addition to and/or instead of those discussed above.

Having described an example system that may be used in controlling and managing identity and access management risks in some embodiments, an example of a method that may, in some embodiments, be performed (e.g., by such a system 200; by another computing device, such as computing device 101; and/or the like) will now be discussed in greater detail with respect to FIG. 3.

Figure 3:
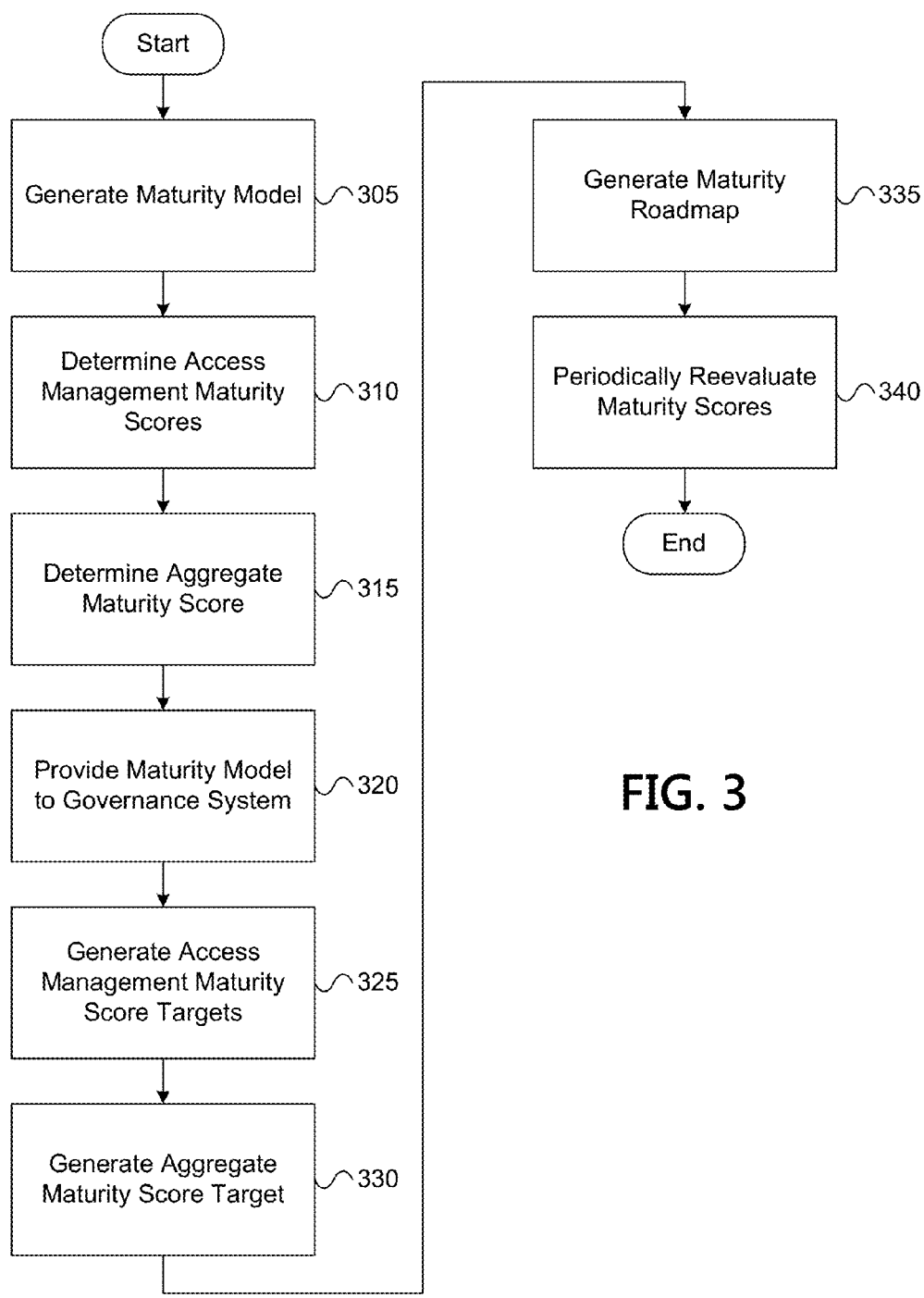
FIG. 3 illustrates a flowchart that depicts a method of controlling and managing identity and access management risks according to one or more aspects of the disclosure.

FIG. 3 illustrates a flowchart that depicts a method of controlling and managing identity and access management risks according to one or more aspects of the disclosure. In some embodiments, the example method illustrated in FIG. 3 may be performed by a computing device, which may include and/or implement one or more aspects of computing device 101. Additionally or alternatively, the example method illustrated in FIG. 3 may be performed by a computer system, such as a server computer system that is owned, operated, and/or controlled by a financial institution (which may, e.g., maintain the computer system in a back office or data center to control and manage identity and access management risks), and such a computer system may include one or more computing devices that include and/or implement one or more aspects of computing device 101 and/or system 200. In other embodiments, the example method illustrated in FIG. 3 may be implemented in and/or may otherwise be embodied in computer-readable instructions that may be stored in a computer-readable medium, such as a memory.

As seen in FIG. 3, the method may be initiated at step 305, in which a maturity model may be generated. For example, at step 305, a computing device (e.g., computing device 101, system 200, and/or the like) may generate a maturity model that maps a plurality of access management controls to a plurality of IT resources associated with an IT environment (e.g., the IT environment of the organization operating the computing device to control and manage identity and access management risks). In some instances, in generating a maturity model, the computing device may generate a table or spreadsheet with a first data series that includes different access management controls (e.g., of the plurality of access management controls) and a second data series that includes different IT resources (e.g., of the plurality of IT resources associated with the IT environment). The maturity model that is generated at step 305 might not yet include any data beyond the information identifying different access management controls and different IT resources, as a plurality of access management maturity scores may subsequently be determined and populated into the maturity model, as discussed in greater detail below.

At step 310, one or more access management maturity scores may be determined. For example, at step 310, the computing device may determine, for each IT resource of the plurality of IT resources, a plurality of access management maturity scores. Each access management maturity score of the plurality of access management scores may, for example, correspond to an access management control of the plurality of access management controls that are associated with the corresponding IT resource. In addition, the access management maturity score for a particular access management control may, for example, indicate and/or otherwise identify a level of maturity of the particular access management control as it is being applied to a particular IT resource. The plurality of access management maturity scores may be normalized to a particular numerical scale (e.g., from zero to ten, from zero to one hundred, and/or the like), and a relatively lower score may be indicative of a relatively lower level of maturity in a particular access management control as it is being applied to a particular IT resource, while a relatively higher score may be indicative of a relatively higher level of maturity in a particular access management control as it is being applied to a particular IT resource.

In some instances, the plurality of access management controls may include a provision control, a de-provision control, an authentication control, an authorization control, and an access review control. In addition, the plurality of IT resources associated with the IT environment may include at least one application resource, at least one database resource, at least one platform resource, at least one network infrastructure resource, at least one collaboration site resource, and at least one third-party hosting resource. In determining one or more access management maturity scores (e.g., at step 310), the computing device may thus evaluate the application of each one of these access management controls to each IT resource within the IT environment. In some instances, in evaluating the application of each access management control to each IT resource within the IT environment, the computing device may, for instance, calculate one or more access management maturity scores based on information that is entered and/or manually assessed by a user of the computing device (e.g., regarding the application of the various access management controls to the various IT resources). Additionally or alternatively, in evaluating the application of each access management control to each IT resource within the IT environment, the computing device may, for instance, calculate one or more access management maturity scores based on data that is collected by the computing device (e.g., from one or more other computer systems, such as a governance system). In calculating one or more access management maturity scores, the computing device also may, in some instances, normalize one or more access management maturity scores to a particular numerical scale that may be used by and/or otherwise implemented by the computing device in connection with the maturity model.

In some embodiments, determining the plurality of access management maturity scores for each IT resource of the plurality of IT resources may include receiving a plurality of indicator values. Each indicator value of the plurality of indicator values may be associated with a category of a plurality of categories, and each category of the plurality of categories may be associated with a process map area of a plurality of process map areas. For example, and as discussed in greater detail below, based on the indicator values that are received by the computing device (and which may, e.g., be selected by a user of the computing device), the computing device may calculate and/or otherwise determine an access management maturity score for a particular IT resource. In particular, each indicator value may, in some instances, be assigned to and/or may otherwise be associated with a particular numerical value, and the computing device may use the numerical values assigned to each of the one or more selected indicator values included in the plurality of indicator values to calculate and/or otherwise determine an access management maturity score for a particular IT resource.

FIGS. 4A-4C illustrate an example of various indicator values that may be used in determining one or more maturity scores according to one or more aspects of the disclosure. In particular, as seen in FIGS. 4A-4C, the application of a particular access management control to a particular IT resource within the IT environment may be evaluated across a number of different process map areas which each have a number of different categories. In receiving and/or gathering the indicator values that reflect the application of a particular access management control to a particular IT resource within the IT environment, the computing device (e.g., computing device 101, system 200, and/or the like) may receive input from one or more users of the computing device and/or one or more other computing devices. In some instances, in addition to or instead of receiving and/or gathering one or more indicator values that are indicative of how a particular access management control is being applied to a particular IT resource within the IT environment, the computing device may automatically determine one or more indicator values by evaluating data collected from one or more other computer systems, such as data obtained from a governance system. In evaluating such data, the computing device may, for example, calculate a particular indicator value by grading performance data against one or more predefined criteria that have been defined for and/or are otherwise associated with the particular indicator value.

As also seen in the example indicator values shown in FIGS. 4A-4C, each indicator value of the plurality of indicator values may be selected from a group of possible indicator values that may, for example, include a performed-ad-hoc value, a managed value, an established value, a predictable-measurable value, and an optimized value. The particular values that are selected and/or input with respect to the application of a particular access management control to a particular IT resource within the IT environment may, for example, be used by the computing device in determining a maturity score for the application of the particular access management control to the particular IT resource. For example, in determining a given maturity score for the application of a particular access management control to a particular IT resource within the IT environment, the computing device (e.g., computing device 101, system 200, and/or the like) may average the particular indicator values, such as the indicator values shown in FIGS. 4A-4C, that are selected and/or input with respect to the application of the particular access management control to the particular IT resource.

As seen in FIGS. 4A-4C, the plurality of process map areas (which may, e.g., be used in evaluating the application of a particular access management control to a particular IT resource within the IT environment) may include a governance area, a build-and-develop area, a tools area, an operations area, and a reporting-and-monitoring area. The governance area may, for example, include a subset of categories including a management category, a standards category, a control-owner category, a quality-assurance-and-quality-control category, a stakeholders category, an organization category, and a risk-portfolio category. The build-and-develop area may, for example, include a subset of categories including an architecture category and a development category. The tools area may, for example, include a subset of categories including a solutions category and a training category. The operations area may, for example, include a subset of categories including a process category, a reconciliation category, and an enforcement category. The reporting-and-monitoring area may, for example, include a subset of categories including a dashboards category, a metrics category, and a report category.

Referring again to FIG. 3, at step 315, an aggregate maturity score may be determined. For example, at step 315, the computing device may determine an aggregate maturity score for the IT environment based on the plurality of access management maturity scores for the plurality of IT resources. In determining such an aggregate maturity score for the IT environment, the computing device may, for example, calculate an average of the plurality of access management maturity scores for the plurality of IT resources.

At step 320, a maturity model may be provided to a governance system. For example, at step 320, the computing device may provide the maturity model and the aggregate maturity score for the IT environment to at least one governance system. In providing the maturity model and the aggregate maturity score for the IT environment to at least one governance system, the computing device may, for example, send, transmit, and/or otherwise communicate the maturity model and/or the aggregate maturity score for the IT environment to one or more other computing devices and/or systems that may, for instance, be used by the organization to monitor and/or govern various risks, including identity and access management risks.

For example, in some instances, the at least one governance system may be configured to identify one or more immature areas in the IT environment for investment based on the maturity model. Such an identification may, for instance, be made and/or otherwise determined by the at least one governance system based on one or more maturity scores falling below a predefined threshold. Additionally or alternatively, the at least one governance system may be configured to determine, for at least one specific IT resource of the plurality of IT resources, at least one specific access management control of the plurality of access management controls for investment. Such a determination may, for instance, be made and/or otherwise determined by the at least one governance system based on a maturity score associated with application of the specific access management control to the specific IT resource falling below a predefined threshold. Additionally or alternatively, the at least one governance system may be configured to generate one or more key deliverables for the at least one specific access management control. Such deliverables may, for example, be determined and/or generated by the at least one governance system so as to increase and/or otherwise improve a maturity score associated with the application of the specific access management control to one or more IT resources. In some instances, the at least one governance system may be configured to apply particular controls to specific systems based on the maturity model and/or based on information associated with the maturity model (which may, e.g., be received by the at least one governance system from the computing device), such as maturity scores, score targets, and/or other factors. For instance, the at least one governance system may select and/or apply particular controls to specific systems based on identifying a particular area in the IT environment for investment, based on determining to invest in a particular access management control for a particular resource, and/or based on identifying one or more key deliverables for a particular access management control.

At step 325, one or more access management maturity score targets may be generated. For example, at step 325, the computing device may generate, for each IT resource of the plurality of IT resources, a plurality of access management maturity score targets. Each access management maturity score target of the plurality of access management maturity score targets may be generated for a particular access management control of the plurality of access management controls that are associated with the corresponding IT resource. Such score targets may, for example, reflect goal and/or ideal values for the corresponding maturity scores, and may reflect values at which associated identity and access management risks may be considered relatively well-controlled.

At step 330, an aggregate maturity score target may be generated. For example, at step 330, the computing device may generate an aggregate maturity score target for the IT environment based on the plurality of access management maturity score targets for the plurality of IT resources. Such a score target may, for example, reflect a goal and/or ideal value for the aggregate maturity score for the IT environment, and may reflect a maturity score value at which the identity and access management risks associated with the overall IT environment may be considered relatively well-controlled. As discussed in greater detail below, the aggregate maturity score target and/or the one or more access management maturity score targets may be provided to a governance system, which may, in some instances, automatically select and apply one or more predefined controls to particular resources (e.g., to satisfy the one or more score targets generated by the computing device).

Figure 5:
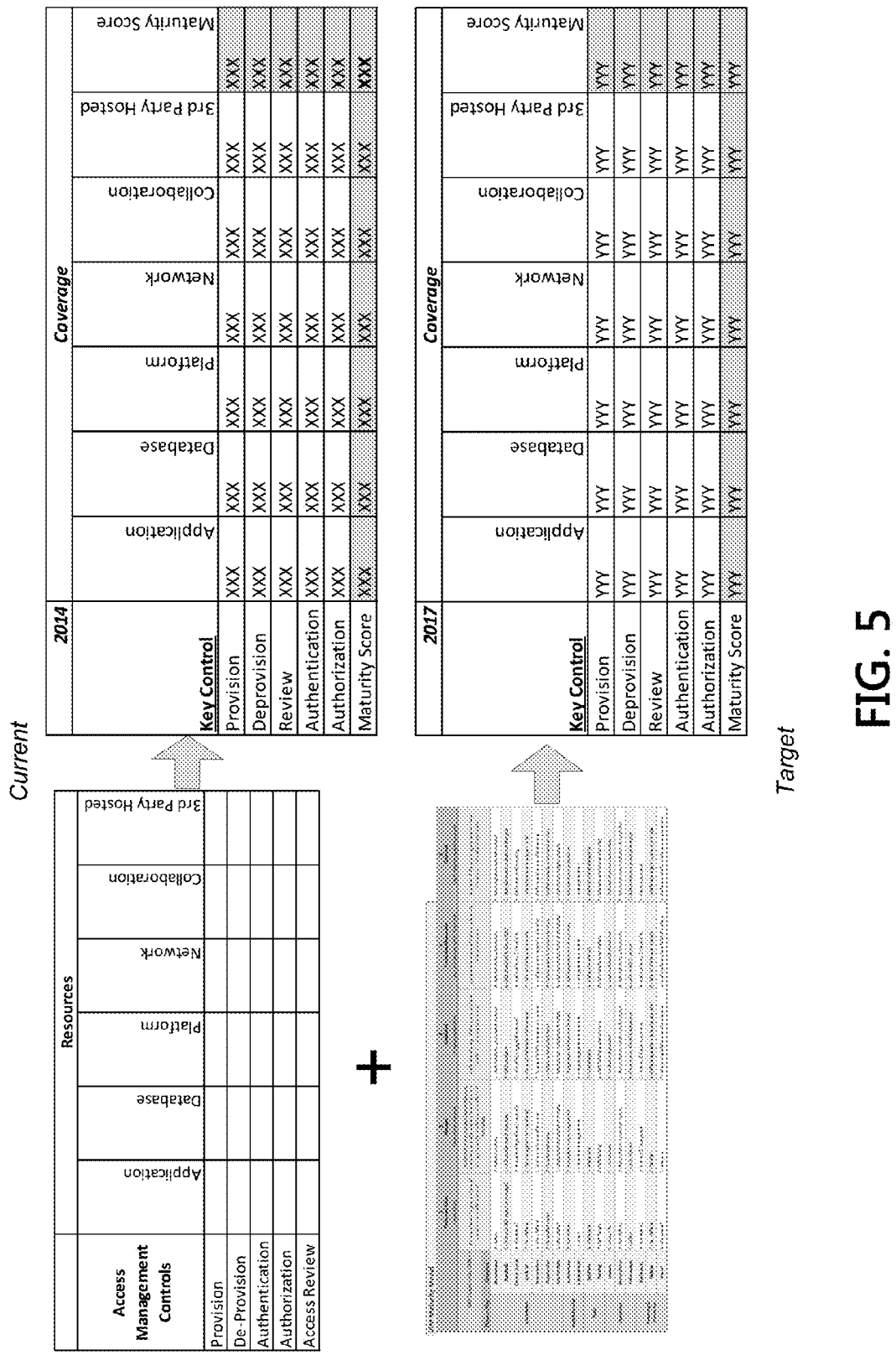
FIG. 5 illustrates an example of a comparison of current maturity scores and target maturity scores according to one or more aspects of the disclosure.

FIG. 5 illustrates an example of a comparison of current maturity scores and target maturity scores according to one or more aspects of the disclosure. In particular, as seen in FIG. 5, one or more current maturity scores may be compared with one or more target maturity scores. Such a comparison may, for instance, include a comparison of individual maturity scores that may reflect the application of particular access management controls to particular IT resources within the IT environment, as well as a comparison of aggregate maturity scores that may reflect the controls applied to identity and access management risks across the overall IT environment.

Referring again to FIG. 3, at step 335, a maturity roadmap may be generated. For example, at step 335, the computing device may generate a maturity roadmap based on the aggregate maturity score target for the IT environment. Such a roadmap may, for instance, include a current value of the aggregate maturity score, a future target value of the aggregate maturity score, and one or more projected targets for the aggregate maturity score at one or more intermediate times.

Figures 6, 7:
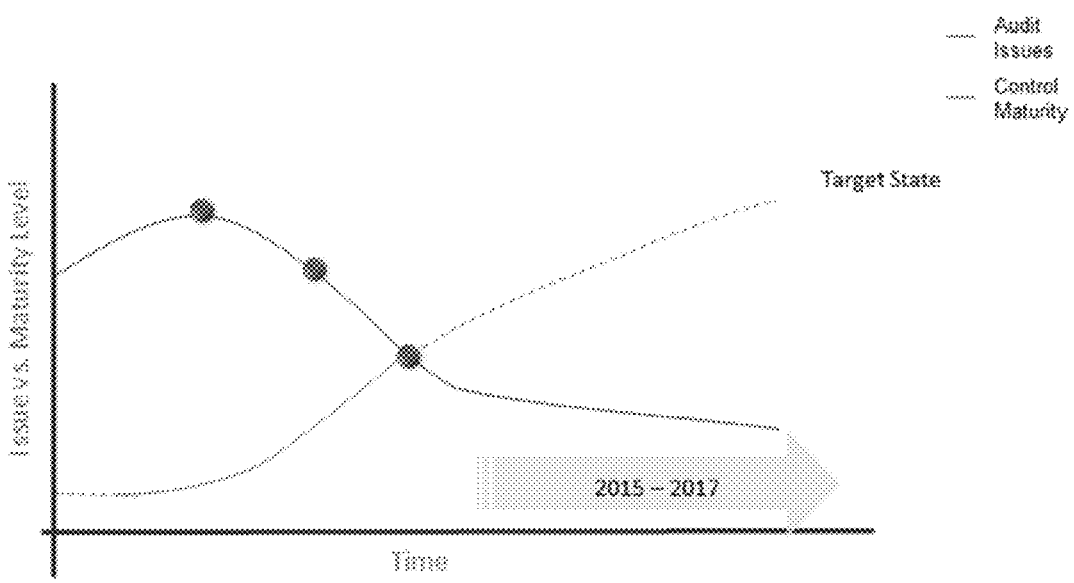
FIG. 6 illustrates an example of a maturity roadmap according to one or more aspects of the disclosure.
FIG. 7 illustrates an example of a maturity analysis graph that may be created by a governance system according to one or more aspects of the disclosure.

FIG. 6 illustrates an example of a maturity roadmap according to one or more aspects of the disclosure. In particular, in the example illustrated in FIG. 6, the maturity roadmap includes a current value for the aggregate maturity score (e.g., for year 2014), one or more past values for the aggregate maturity score (e.g., for years 2012 and 2013), a future target value for the aggregate maturity score (e.g., for year 2017), and several projected target values for the aggregate maturity score at several intermediate times (e.g., for years 2015, 2016, and 2017).

Referring again to FIG. 3, at step 340, one or more maturity scores may be periodically reevaluated. For example, at step 340, the computing device may periodically reevaluate, for each IT resource of the plurality of IT resources, the plurality of access management maturity scores to determine an updated aggregate maturity score for the IT environment. In periodically reevaluating the plurality of access management maturity scores, the computing device (e.g., computing device 101, system 200, and/or the like) may, for instance, access and/or load current and/or updated data to determine one or more updated maturity scores for the IT environment. For example, the computing device may be configured to reevaluate the one or more maturity scores twice a year and report the updated results to one or more other systems and/or entities so as to enable tracking and/or monitoring of identity and access management risks associated with the organization's information technology environment.

FIG. 7 illustrates an example of a maturity analysis graph that may be created by a governance system according to one or more aspects of the disclosure. The maturity analysis graph illustrated in FIG. 7 may, for example, be generated and/or otherwise created by a governance system after receiving a maturity model and/or one or more maturity scores for the IT environment. In addition, as seen in FIG. 7, as the one or more maturity scores are periodically reevaluated and various controls are implemented and/or updated over time, an aggregate maturity score may increase and a number of risk items and/or other risk issues may correspondingly decrease.

Figure 8:
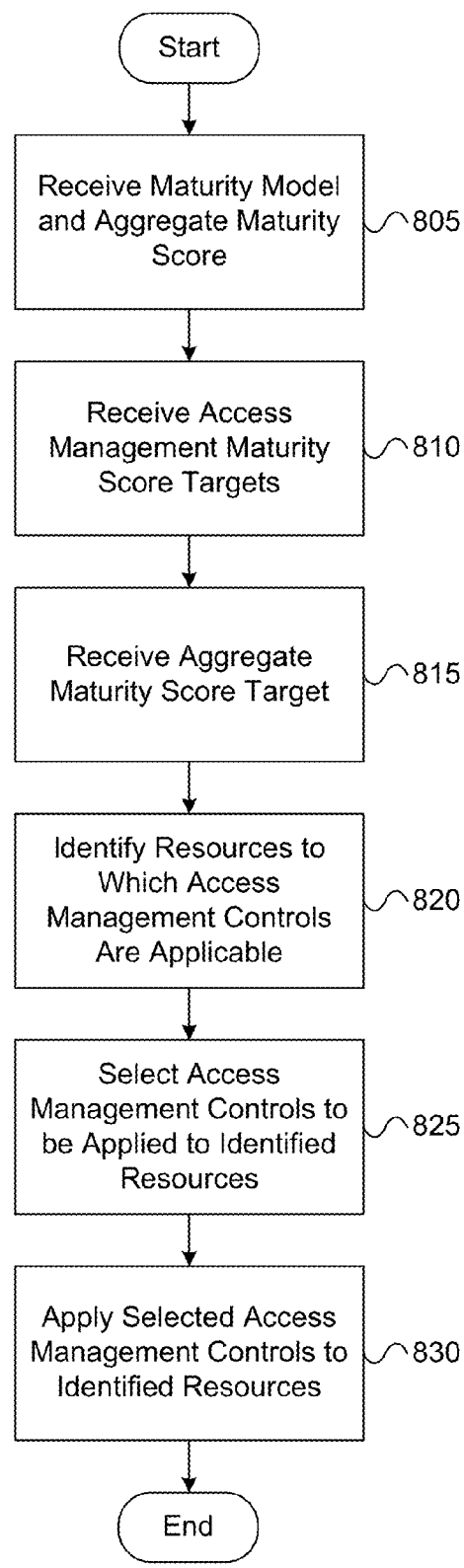
FIG. 8 illustrates a flowchart that depicts a method of automatically selecting and applying access management controls based on maturity score targets and other maturity information associated with an IT environment according to one or more aspects of the disclosure.

FIG. 8 illustrates a flowchart that depicts a method of automatically selecting and applying access management controls based on maturity score targets and other maturity information associated with an IT environment according to one or more aspects of the disclosure. In some embodiments, the example method illustrated in FIG. 8 may be performed by a computing device, which may include and/or implement one or more aspects of computing device 101. Additionally or alternatively, the example method illustrated in FIG. 8 may be performed by a computer system, such as a governance system that is owned, operated, and/or controlled by a financial institution (which may, e.g., interface with the computing device and/or the computing system that may perform the example method illustrated in FIG. 3), and such a governance system may include one or more computing devices that include and/or implement one or more aspects of computing device 101. In other embodiments, the example method illustrated in FIG. 8 may be implemented in and/or may otherwise be embodied in computer-readable instructions that may be stored in a computer-readable medium, such as a memory.

As seen in FIG. 8, the method may be initiated at step 805 in which a maturity model and an aggregate maturity score may be received. For example, at step 805, a governance system, such as the at least one governance system discussed above, may receive a maturity model and an aggregate maturity score for an IT environment, such as the maturity model generated by the computing device and the aggregate maturity score determined by the computing device in the examples discussed above. At step 810, one or more access management maturity score targets may be received. For example, at step 810, the governance system may receive, from the computing device, the plurality of access management maturity score targets for the plurality of IT resources generated by the computing device in the examples discussed above. At step 815, an aggregate maturity score target may be received. For example, at step 815, the governance system may receive the aggregate maturity score target for the IT environment generated by the computing device in the examples discussed above.

At step 820, one or more resources to which one or more access management controls are applicable may be identified. For example, at step 820, the governance system may identify one or more IT resources of the plurality of IT resources to which one or more automated access management controls can be applied. At step 825, one or more access management controls to be applied to the one or more identified resources may be selected. For example, at step 825, the governance system may select at least one automated access management control of the one or more automated access management controls to be applied to the one or more identified IT resources, based on the maturity model, the aggregate maturity score for the IT environment, the plurality of access management maturity score targets for the plurality of IT resources, and/or the aggregate maturity score target for the IT environment. Such an automated access management control may, for instance, be a predefined control that can be automatically applied by the governance system to a particular resource, such as a monitoring and/or metric reporting script that can be executed by the governance system and/or by another computer system on an on-demand and/or periodic basis to gather and report information about a particular resource.

At step 830, the one or more selected access management controls may be applied to the one or more identified resources. For example, at step 830, the governance system may apply the at least one selected automated access management control of the one or more automated access management controls to the one or more identified IT resources. In selecting and/or applying one or more automated access management controls, the governance system may, for instance, select and/or apply one or more controls that are configured to initiate automated logging, monitoring, and/or reporting of specific circumstances, occurrences, and/or conditions that may be associated with one or more specific resources and/or one or more specific process map categories. For example, the governance system may select and apply a particular access management control to a database resource in the IT environment, and the selected and applied access management control may cause the governance system to monitor occurrences and/or events associated with authentication aspects of the database resource, such as a total number of authentication attempts, a number of successful authentication attempts, a number of unsuccessful authentication attempts, and/or other statistics that may be facilitate control over the authentication aspects of the database resource.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable memory. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims are included in the scope of the present disclosure. For example, the steps illustrated in the illustrative figures may be performed in other than the recited order, and one or more steps illustrated may be optional in accordance with aspects of the disclosure.

What is claimed is:

1. A method of controlling identity and access management risk in an information technology (IT) environment, comprising:
    generating, by at least one computing device, a maturity model that maps a plurality of access management controls to a plurality of IT resources associated with the IT environment;
    determining, by the at least one computing device, for each IT resource of the plurality of IT resources, a plurality of access management maturity scores, each access management maturity score of the plurality of access management scores corresponding to an access management control of the plurality of access management controls that are associated with the corresponding IT resource;
    determining, by the at least one computing device, an aggregate maturity score for the IT environment based on the plurality of access management maturity scores for the plurality of IT resources; and
    providing, by the at least one computing device, the maturity model and the aggregate maturity score for the IT environment to at least one governance system.

2. The method of claim 1,
    wherein determining the plurality of access management maturity scores for each IT resource of the plurality of IT resources includes receiving a plurality of indicator values,
    wherein each indicator value of the plurality of indicator values is associated with a category of a plurality of categories, and
    wherein each category of the plurality of categories is associated with a process map area of a plurality of process map areas.

3. The method of claim 1, further comprising:
    generating, by the at least one computing device, for each IT resource of the plurality of IT resources, a plurality of access management maturity score targets, each access management maturity score target of the plurality of access management maturity score targets being generated for a particular access management control of the plurality of access management controls that are associated with the corresponding IT resource.

4. The method of claim 3, further comprising:
    generating, by the at least one computing device, an aggregate maturity score target for the IT environment based on the plurality of access management maturity score targets for the plurality of IT resources.

5. The method of claim 4, further comprising:
    generating, by the at least one computing device, a maturity roadmap based on the aggregate maturity score target for the IT environment.

6. The method of claim 4, wherein the at least one governance system is configured to:
receive, from the at least one computing device, the maturity model and the aggregate maturity score for the IT environment;
receive, from the at least one computing device, the plurality of access management maturity score targets for the plurality of IT resources;
receive, from the at least one computing device, the aggregate maturity score target for the IT environment;
identify one or more IT resources of the plurality of IT resources to which one or more automated access management controls are applicable;
select at least one automated access management control of the one or more automated access management controls to be applied to the one or more identified IT resources, based on the maturity model, the aggregate maturity score for the IT environment, the plurality of access management maturity score targets for the plurality of IT resources, and the aggregate maturity score target for the IT environment; and
apply the at least one selected automated access management control of the one or more automated access management controls to the one or more identified IT resources.

7. The method of claim 1, further comprising:
periodically reevaluating, for each IT resource of the plurality of IT resources, the plurality of access management maturity scores to determine an updated aggregate maturity score for the IT environment.

8. The method of claim 1,
wherein the plurality of access management controls include a provision control, a de-provision control, an authentication control, an authorization control, and an access review control, and
wherein the plurality of IT resources associated with the IT environment include at least one application resource, at least one database resource, at least one platform resource, at least one network infrastructure resource, at least one collaboration site resource, and at least one third-party hosting resource.

9. The method of claim 2, wherein the plurality of process map areas include a governance area, a build-and-develop area, a tools area, an operations area, and a reporting-and-monitoring area.

10. The method of claim 9, wherein the governance area is associated with a first subset of the plurality of categories, the first subset of the plurality of categories including a management category, a standards category, a control-owner category, a quality-assurance-and-quality-control category, a stakeholders category, an organization category, and a risk-portfolio category.

11. The method of claim 9, wherein the build-and-develop area is associated with a second subset of the plurality of categories, the second subset of the plurality of categories including an architecture category and a development category.

12. The method of claim 9, wherein the tools area is associated with a third subset of the plurality of categories, the third subset of the plurality of categories including a solutions category and a training category.

13. The method of claim 9, wherein the operations area is associated with a fourth subset of the plurality of categories, the fourth subset of the plurality of categories including a process category, a reconciliation category, and an enforcement category.

14. The method of claim 9, wherein the reporting-and-monitoring area is associated with a fifth subset of the plurality of categories, the fifth subset of the plurality of categories including a dashboards category, a metrics category, and a report category.

15. The method of claim 2, wherein each indicator value of the plurality of indicator values is selected from a group of possible indicator values including a performed-ad-hoc value, a managed value, an established value, a predictable-measurable value, and an optimized value.

16. The method of claim 1, wherein the at least one governance system is configured to identify one or more immature areas in the IT environment for investment based on the maturity model.

17. The method of claim 16, wherein the at least one governance system is configured to determine, for at least one specific IT resource of the plurality of IT resources, at least one specific access management control of the plurality of access management controls for investment.

18. The method of claim 17, wherein the at least one governance system is configured to generate one or more key deliverables for the at least one specific access management control.

19. A system for controlling identity and access management risk in an information technology (IT) environment, comprising
at least one processor; and
memory storing computer-readable instructions that, when executed by the at least one processor, cause the system to:
generate a maturity model that maps a plurality of access management controls to a plurality of IT resources associated with the IT environment;
determine, for each IT resource of the plurality of IT resources, a plurality of access management maturity scores, each access management maturity score of the plurality of access management scores corresponding to an access management control of the plurality of access management controls that are associated with the corresponding IT resource;
determine an aggregate maturity score for the IT environment based on the plurality of access management maturity scores for the plurality of IT resources; and
provide the maturity model and the aggregate maturity score for the IT environment to at least one governance system.

20. One or more non-transitory computer-readable media storing instructions that, when executed by at least one computing device, cause the at least one computing device to:
generate a maturity model that maps a plurality of access management controls to a plurality of IT resources associated with the IT environment;
determine, for each IT resource of the plurality of IT resources, a plurality of access management maturity scores, each access management maturity score of the plurality of access management scores corresponding to an access management control of the plurality of access management controls that are associated with the corresponding IT resource;
determine an aggregate maturity score for the IT environment based on the plurality of access management maturity scores for the plurality of IT resources; and provide the maturity model and the aggregate maturity score for the IT environment to at least one governance system.

\* \* \* \* \*